United States Patent Office 3,466,263
Patented Sept. 9, 1969

3,466,263
COPOLYMERIZING FORMALDEHYDE OLIGO-
MERS AND HEPTADIENES WITH ARSENIC
AND ANTIMONY FLUORIDE CATALYSTS
Herbert May, Windsor Tower, N.Y., and Derek Bernard
Partridge, Stourbridge, England, assignors to British
Industrial Plastic Limited, Manchester, England, a corporation of the United Kingdom
No Drawing. Filed Oct. 28, 1966, Ser. No. 590,193
Claims priority, application Great Britain Nov. 1, 1965,
46,158/65
The portion of the term of the patent subsequent to
July 30, 1985, has been disclaimed
Int. Cl. C08g 1/18, 1/20
U.S. Cl. 260—73                                          8 Claims

ABSTRACT OF THE DISCLOSURE

A high molecular weight oxymethylene copolymer is prepared by copolymerising a formaldehyde oligomer, e.g., trioxan or tetroxan with a comonomer having the formula

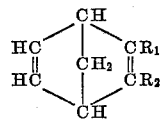

where $R_1$ and $R_2$ are hydrogen, alkyl, substituted alkyl, aryl, substituted aryl, aralkyl or aldehyde group using antimony pentafluoride, arsenic pentafluoride or a complex thereof. There can also be included additional copolymerisable compounds.

---

This invention relates to polymers and to the production thereof, and is especially concerned with a novel class of oxymethylene polymers.

Oxymethylene polymers, both homopolymers and copolymers, are well known, and it is known that they may be produced by polymerising formaldehyde or trioxan, with or without comonomers. These polymers are known as oxymethylene polymers, or polyoxymethylenes, since they contain a great proportion of oxymethylene, —CH₂O—, units. Indeed, the homopolymers contain chains consisting exclusively of oxymethylene units, with possibly other groups at their ends, and the copolymers are made up of a major proportion of oxymethylene units having units of the comonomer interspersed throughout the oxymethylene chains. Oxymethylene polymers have been found to be extremely valuable as moulding materials, and a particularly desirable characteristic in a moulding material is a high thermal stability. The thermal stabilities of known oxymethylene polymers have varied quite widely, depending on the method used for their production, the nature of the comonomer if such is used, whether or not auxiliary stabilisers are used, and so on. It is the object of the present invention to provide an oxymethylene polymer which has a good thermal stability and which, because of this property and also its good molecular weight, is useful for moulding.

According to the present invention we provide a high molecular weight oxymethylene copolymer consisting of a major proportion of oxymethylene units and containing also, interspersed throughout the polymer chain, units derived from at least one compound of the general formula

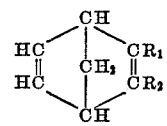

wherein $R_1$ and $R_2$ (same or different) are hydrogen, an alkyl or substituted alkyl radical, an aryl or substituted aryl radical, an aralkyl or substituted aralkyl radical, or an aldehyde group.

Also according to the invention a process for the production of these high molecular weight copolymers comprises effecting the copolymerisation of a low molecular weight formaldehyde oligomer and a compound or compounds having the above-defined general formula.

An especially suitable comonomer is bicyclo-[1,1,1]-hepta-2,5-diene, which has the formula in which $R_1$ and $R_2$ are both hydrogen. The use of this comonomer enables the production of copolymers which have a high heat stability and which are resistant to alkaline degradation. Derivatives of this compound are also suitable comonomers and as examples there may be mentioned the 2-methyl, 2-ethyl, 2-chloromethyl and 2-carboxyaldehyde derivatives.

Suitable low molecular weight formaldehyde oligomers which may be used as a source of the oxymethylene units in the new copolymers are trioxan and tetroxan.

The copolymerisation of the low molecular weight formaldehyde oligomer and the compound or compounds of the above general formula may be catalysed by electrophilic catalysts, for example those listed in U.K. patent specification No. 878,163. Preferred catalysts include antimony pentafluoride and arsenic pentafluoride, and their coordination and ionic complexes. Examples of their coordination complexes are those complexes with organic compounds in which the donor atom is oxygen or sulphur. Examples of these are complexes with alcohols, phenols, acids, ethers, acid anhydrides, ketones, esters, dialkyl sulphides and mercaptans. More especially there may be mentioned the complexes of antimony pentafluoride and arsenic pentafluoride with methanol, ethanol, propanol, butanol, triphenyl methyl alcohol, methyl acetate, butyl acetate, phenyl acetate, benzoic acid, acetic acid, acetic anhydride, acetone, methyl ethyl ketone, dimethyl ether, diethyl ether, methyl phenyl ether, phenol, dimethyl sulphide, diethyl sulphide and ethyl mercaptan. The complexes of antimony pentafluoride and arsenic pentafluoride with alkyl cyanides, for example methyl cyanide and ethyl cyanide, are also suitable catalysts for use in the process of the invention, as are the complexes of antimony pentafluoride and arsenic pentafluoride with alkyl, aralkyl, aryl and acyl halides, some of which may be ionic; an example is the compound formed when antimony pentafluoride is dissolved in certain halogenated paraffins such as 1,1,2-trichloro-1,2,2-trifluoro ethane, and allowed to stand.

Ionic complexes suitable for use as catalysts in the process of the invention are those salts containing the hexafluoroantimonate anion, $SbF_6^-$ or the hexafluoroarsenate anion, $AsF_6^-$. Examples are:

(a) carbonium hexafluoroantimonates, e.g. trityl hexafluoroantimonate, diphenylmethyl hexafluoroantimonate, phenyl-di-tolylmethyl hexafluoroantimonate, tolyl-diphenylmethyl hexafluoroantimonate, tritolylmethyl hexafluoroantimonate;

(b) carboxonium hexafluoroantimonates, e.g. dioxolinium hexafluoroantimonate, acetyl hexafluoroantimonate, benzoyl hexafluoroantimonate;

(c) oxonium and hydroxonium hexafluoroantimonates, e.g. trialkyloxonium hexafluoroantimonates such as triethyloxonium hexafluoroantimonate, hydroxonium hexafluoroantimonate;

(d) aryl diazonium hexafluoroantimonates, e.g. phenyl diazonium hexafluoroantimonate;

(e) iodonium hexafluoroantimonate;

(f) nitrosyl and nitryl hexafluoroantimonates;

(g) sulphonium hexafluoroantimonates or pentafluoroantimonates;

(h) the analogous hexafluoroarsenates.

Still further suitable catalysts include compounds analogous to those designated (a) to (h) above, but having one or two of the fluorine atoms in the anion replaced by another electronegative substituent, e.g. chlorine, hydroxyl or fluorosulphonate, for instance trityl chloropentafluoroantimonate and phenyl diazonium hydroxypentafluoroarsenate. Again, such electrophilic catalysts as trityl hexafluorotantalate, trityl hexafluoroniobate, trityl tetrafluoroborate, trityl perchlorate, trityl penachlorostannate and acetyl perchlorate may be used.

The invention also provides high molecular weight oxymethylene copolymers which comprise a major proportion of oxymethylene units and also contain units derived from the cyclic compounds defined above together with units of at least one other compound which is copolymerisable with trioxan. Examples of such further compounds are styrene and its derivatives, cyclic ethers such as dioxolan, allyl compounds such as allyl ethers and esters, vinyl compounds such as vinyl esters, cyclic esters such as lactones, aldehydes, and bicyclo-[2,2,1]-hept-2-ene and its derivatives. These latter have the general formula

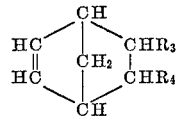

wherein $R_3$ and $R_4$ (same or different) are hydrogen, alkyl, substituted alkyl, aryl, aralkyl or aldehydo. $R_3$ and $R_4$ may together form part of a further carbocyclic or heterocyclic ring. Furthermore, the group $>CHR_4$ may be replaced by a grouping $>C=R_5$, $R_5$ being an alkylene radical. These modified copolymers may be made in exactly the same way as the copolymers described above.

Normally the copolymerisation reactants will be reacted together in proportions such that the formaldehyde oligomer constitutes from 50 to 99.99% by weight based on the weight of formaldehyde oligomer and comonomer(s), preferably from 80 to 99.95%, and more prefreably from 93 to 99.9%, on the same basis.

The process is preferably carried out in the presence of the minimum of moisture, and suitably under anhydrous conditions. It may be conducted under bulk conditions or it may be of advantage to conduct the polymerisation in an inert liquid medium, which may be a solvent or nonsolvent for the monomers under the polymerisation conditions. Suitable solvents include saturated aliphatic and cycloaliphatic hydrocarbons, chlorinated aliphatic and cycloaliphatic hydrocarbons, and aliphatic and aromatic nitrohydrocarbons. Cyclohexane is particularly suitable. It is often convenient to add the catalyst in the form of a solution, for example in an aliphatic nitrohydrocarbon such as nitroethane or nitropropane, or in a halogenated paraffin, to the monomers in the same or a different solvent.

The temperature of the polymerisation reaction may vary depending on the particular comonomers used, the solvent, the catalyst and so on. However, it is normally preferred to effect reaction at a temperature between room temperature and 100° C. The reaction may, if desired, be carried out under an inert atmosphere, for example of nitrogen or carbon dioxide. Superatmospheric pressure may also be employed if desired.

The mechanism of the copolymerisation reaction is not precisely understood, but it is thought that, depending upon the particular reaction conditions used, the degree of purity of the reactants, and so on, the entry of the comonomer may be (i) via the carbon-carbon double bond at the 2,3 positions, thus

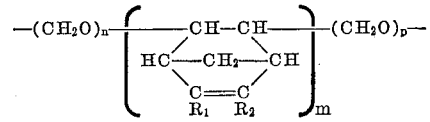

or (ii) by breakage of the 1,4 bridge, thus

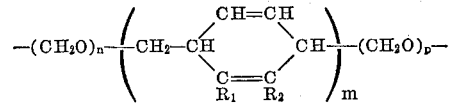

or (iii) by breakage of the carbon-carbon bond in the 1, 2 positions, thus

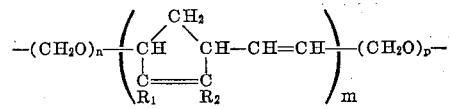

The references $n$, $m$ and $p$ used above all represent positive integers, and as an example of the sort of copolymers provided by the invention we may mention those in which $m=1$ and $n=p=2000$ to 3000. It will be appreciated that the above formulae do not signify the whole polymer; they merely illustrate a representative part.

The invention is illustrated by means of the following examples. Where reference is made to inherent viscosity, this was determined on a 0.5% by weight solution of the polymer in p-chlorophenol containing 2% alpha-pinene at 60° C. The alkaline degradation yield was determined by dissolving 10 gms. of the polymer in 150 mls. dimethylformamide containing 0.4 gm. sodium carbonate at 150° C. This solution was maintained at about 150° C. for ½ hour, after which time the polymer was reprecipitated by cooling, washed with water and acetone, and dried in a vacuum oven. The alkaline degradation yield is the proportion, as a percentage of the polymer dissolved, of solid polymer recovered after this treatment.

EXAMPLE 1

50 gms. trioxan, freshly distilled from calcium hydride and stearylamine, 50 gms. dry cyclohexane and 3 gms. bicyclo-[2,2,1]-hepta-2,5-diene were stirred together in a flask fitted with a condenser and kept at 60° C. in a water bath. 0.0021 gm. trityl hexafluoroantimonate was added as a 1% solution in nitropropane, and polymer began to deposit immediately. After 1 hour the product was filtered off, washed in acetone, and then heated to 85° C. in 3% ammonia for 15 minutes. It was then thoroughly washed in water and dried in a vacuum oven. The yield was 49% of a polymer showing an alkaline degradation yield of 87%.

EXAMPLES 2–22

Example 1 was repeated, except that the amount of bicyclo-[2,2,1]-hepta-2,5-diene comonomer, the kind and amount of catalyst and solvent employed, and the reaction time and temperature were varied as indicated in Table 1. In Examples 2 to 16 the proportion of cyclohexane to trioxan was 3:2. In Examples 17 and 18 the solvent was methylene dichloride in the proportion methylene dichloride:trioxane:: 1:2. In Examples 19 and 20 the solvent was heptane in the proportion heptane:trioxan:: 2:1, and in Examples 21 and 22 the solvent was cyclohexane in the proportion cyclohexane:trioxan:: 1:1 in Example 21 and cyclohexane:trioxan:: 3:2 in Example 22. The reaction temperature in Examples 17 and 18 was 35° C.

TABLE 1

| Example No. | Catalyst | Percent catalyst (by wt.) | Percent comonomer (by wt.) | Reaction time (hrs.) | Percent conversion | Percent degradation yield | Inherent viscosity |
|---|---|---|---|---|---|---|---|
| 2 | Trityl hexafluoroantimonate | 0.005 | 0.5 | 1 | 79 | 74 | 3.43 |
| 3 | do | 0.0085 | 2 | 1 | 62 | 82 | 1.86 |
| 4 | do | 0.009 | 3 | 1 | 46 | 88 | 1.34 |
| 5 | Trityl hexafluoroarsenate | 0.01 | 2 | 1 | 45 | 87 | 1.81 |
| 6 | Triethyloxonium hexafluoroantimonate | 0.0060 | 3 | 1 | 46 | 83 | 1.26 |
| 7 | Tritylhydroxy pentafluoroantimonate | 0.020 | 3 | 1.5 | 65 | 82 | 1.19 |
| 8 | Tritylchloro pentafluoroantimonate | 0.020 | 3 | 1.5 | 55 | 80 | 0.98 |
| 9 | Antimonypentafluoride methylcyanide complex | 0.024 | 1.5 | 1.5 | 33 | 82 | 1.07 |
| 10 | Tritylhexafluorotantalate | 0.015 | 1.5 | 21 | 63 | 67 | 1.22 |
| 11 | Tritylhexafluoroniobate | 0.10 | 1.5 | 21 | 62 | 68 | 1.11 |
| 12 | p-Tolyl diazonium hexafluoroantimonate | 0.001 | 3 | 2 | 52 | 90 | 1.64 |
| 13 | Trityl tetrafluoroborate | 0.5 | 0.5 | 21 | 84 | 32 | 0.83 |
| 14 | Trityl perchlorate | 0.18 | 1 | 21 | 40 | 24 | 0.12 |
| 15 | Trityl pentachlorostannate | 0.30 | 1 | 21 | 54 | 31 | 0.45 |
| 16 | Acetyl perchlorate | 0.076 | 1 | 2 | 42 | 42 | 0.39 |
| 17 | Tritylhexafluoroantimonate | 0.065 | 3 | 19 | 84 | 73 | 1.33 |
| 18 | Arsenic pentafluoride etherate complex | 0.25 | 3 | 22 | 91 | 76 | 1.11 |
| 19 | Trityl hexafluoroantimonate | 0.0065 | 1.5 | 2 | 39 | 85 | 1.46 |
| 20 | do | 0.012 | 3.0 | 2 | 38 | 90 | 1.11 |
| 21 | do | 0.010 | 4.5 | 1.25 | 45 | 87 | 0.92 |
| 22 | do | 0.010 | 8.1 | 1 | 27 | 96 | 0.70 |

EXAMPLES 23–29

The process of Example 1 was repeated, except that a further comonomer was added to the reaction mixture. The concentrations, reaction conditions and details of product were as set out in Table 2. In every example the catalyst was trityl hexafluoroantimonate. The concentration of the comonomers is given as a percentage of the weight of trioxan in the reaction mixture.

TABLE 2.—COPOLYMERISATION OF TRIOXAN, BICYCLO-[2,2,1]-HEPTA-2,5-DIENE AND A THIRD COMONOMER

| Example No. | Conc. of bicyclo-[2,2,1]-hepta-2,5-diene | Third comonomer | Conc. of third comonomer | Conc. of catalyst | Reaction time (hrs.) | Percent conversion | Percent degradation yield | Inherent viscosity |
|---|---|---|---|---|---|---|---|---|
| 23 | 2.0 | Dioxolane | 0.1 | 0.008 | 2.5 | 47.8 | 92.0 | 2.46 |
| 24 | 2.0 | do | 0.2 | 0.008 | 2.5 | 47.1 | 88.4 | 2.2 |
| 25 | 2.5 | do | 0.1 | 0.0088 | 2.5 | 59.5 | 90.0 | 2.31 |
| 26 | 3.0 | do | 0.2 | 0.009 | 2 | 46.0 | 88.9 | 1.66 |
| 27 | 1.0 | Styrene | 4.0 | 0.008 | 2.25 | 61.7 | 76.4 | 1.21 |
| 28 | 2.0 | do | 2.0 | 0.008 | 2.5 | 61.2 | 78 | 1.1 |
| 29 | 3.0 | Bicyclo-[2,2,1]-hept-2-ene | 0.1 | 0.008 | 3 | 63.4 | | 1.65 |

What is claimed is:
1. A process for the production of a high molecular weight oxymethylene copolymer which comprises effecting the copolymerization of a low molecular weight cyclic formaldehyde oligomer and a comonomer of the general formula

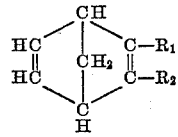

wherein $R_1$ and $R_2$ are hydrogen, alkyl or chloro-substituted alkyl group, aryl group, aralkyl group, or aldehyde group, the copolymerization being effected by means of a catalyst which is selected from the group consisting of triphenylmethyl hexafluoroantimonate, triphenylmethyl hexafluoroarsenate, triethyloxonium hexafluoroantimonate, p-tolyldiazonium hexafluoroantimonate, triphenylmethyl hydroxypentafluoroantimonate and triphenylmethyl chloropentafluoroantimonate.

2. A process according to claim 1 wherein the catalyst is selected from the group consisting of triphenylmethyl hexafluoroantimonate, triphenylmethyl hexafluoroarsenate, triethyloxonium hexafluoroantimonate and p-tolyldiazonium hexafluoroantimonate.

3. A process according to claim 1 wherein the catalyst is selected from the group consisting of triphenylmethyl hydroxypentafluoroantimonate and triphenylmethyl chloropentafluoroantimonate.

4. A process according to claim 1 wherein the copolymer is a copolymer of trioxan and bicyclo-[2,2,1]-hepta-2,5-diene.

5. A process according to claim 4 wherein the catalyst is selected from the group consisting of triphenylmethyl hexafluoroantimonate, triphenylmethyl hexafluoroarsenate, triethyloxonium hexafluoroantimonate and p-tolyldiazonium hexafluoroantimonate.

6. A process according to claim 4 wherein the catalyst is selected from the group consisting of triphenylmethyl hydroxypentafluoroantimonate and triphenylmethyl chloropentafluoroantimonate.

7. A process according to claim 1 wherein the catalyst is triphenylmethyl hexafluoroarsenate.

8. A process according to claim 7 wherein the copolymer is a copolymer of trioxan and bicyclo-[2,2,1]-hepta-2,5-diene.

References Cited

UNITED STATES PATENTS

| 3,219,631 | 11/1965 | Kullmar et al. | 260—67 |
| 3,272,780 | 9/1966 | Wilson et al. | 260—73 |
| 3,288,756 | 11/1966 | Buckley | 260—67 |
| 3,296,210 | 1/1967 | Wilson et al. | 260—73 |
| 3,344,120 | 9/1967 | Rosen | 260—73 |
| 3,379,655 | 4/1968 | May et al. | 260—2 |
| 3,395,124 | 7/1968 | May et al. | 260—67 |

HAROLD D. ANDERSON, Primary Examiner

L. M. PHYNES, Assistant Examiner

U.S. Cl. X.R.

260—67